(12) United States Patent
Tsai

(10) Patent No.: US 9,187,352 B2
(45) Date of Patent: Nov. 17, 2015

(54) PREPARATION METHOD OF WEAKLY BASIC, IONIZED, MINERALIZATION AND HEALTHY DRINKING WATER

(71) Applicant: Chen-Sheng Tsai, Guangdong (CN)

(72) Inventor: Chen-Sheng Tsai, Guangdong (CN)

(73) Assignee: GUANGDONG PINSHINE ENVIRONMENTAL TECHNOLOGIES CO., LTD, Guangdong (CN)

( * ) Notice: Subject to any disclaimer, the term of this patent is extended or adjusted under 35 U.S.C. 154(b) by 435 days.

(21) Appl. No.: 13/669,432

(22) Filed: Nov. 5, 2012

(65) Prior Publication Data

US 2013/0115335 A1    May 9, 2013

(30) Foreign Application Priority Data

Nov. 8, 2011 (CN) .......................... 2011 1 0350929

(51) Int. Cl.
| | |
|---|---|
| *A23L 2/70* | (2006.01) |
| *C02F 1/68* | (2006.01) |
| *A23L 2/52* | (2006.01) |
| *A23L 1/304* | (2006.01) |
| *C02F 9/00* | (2006.01) |
| *A23L 2/74* | (2006.01) |
| *C02F 1/00* | (2006.01) |
| *C02F 1/02* | (2006.01) |
| *C02F 1/28* | (2006.01) |
| *C02F 1/44* | (2006.01) |

(52) U.S. Cl.
CPC . *C02F 1/68* (2013.01); *A23L 1/304* (2013.01); *A23L 2/52* (2013.01); *A23L 2/74* (2013.01); *C02F 9/00* (2013.01); *C02F 1/001* (2013.01); *C02F 1/02* (2013.01); *C02F 1/283* (2013.01); *C02F 1/441* (2013.01); *C02F 2201/006* (2013.01)

(58) Field of Classification Search
CPC ............ C02F 1/68; C02F 9/005; C02F 1/001; C02F 1/283; A23L 1/304
USPC ...................... 426/74, 66, 479, 520
See application file for complete search history.

(56) References Cited

U.S. PATENT DOCUMENTS

| 8,142,654 B2 * | 3/2012 | Kohl .............................. 210/244 |
| 2009/0173616 A1 * | 7/2009 | Cabados et al. ............... 202/176 |
| 2012/0168367 A1 * | 7/2012 | Fu ................................ 210/287 |

* cited by examiner

*Primary Examiner* — Helen F Heggestad

(57) ABSTRACT

Disclosed is a preparation method of weakly basic, ionized, mineralized and healthy drinking water including purifying the tap water by precipitation, filtration and other conventional methods to obtain clean water; and getting the said clean water through reverse osmosis (RO) membrane to obtain RO pure water; heating the said RO pure water to 35-100 degrees celsius by magnetic oscillation or by heating, and then making the RO pure water through weak alkaline, ionized, and mineralization composition, and then filtering the RO pure water by coconut carbon cartridge and PP cotton filter element in turn. The water prepared by the method of the present invention is beneficial to the health of human body and suitable for long-term consumption.

7 Claims, No Drawings

PREPARATION METHOD OF WEAKLY BASIC, IONIZED, MINERALIZATION AND HEALTHY DRINKING WATER

BACKGROUND OF THE INVENTION

The present invention relates generally to drinking water, and more particularly to a preparation method of healthy drinking water which is rich in anion, minerals and oxygen.

Tourmaline, a kind of silicate minerals, is a multi-element natural mineral, which contains at least 10 trace elements beneficial to human body, such as magnesium, aluminum, iron and boron. Tourmaline was first discovered in Sri Lanka, and was regarded as precious as diamond and ruby. It was noticed that tourmaline would take charge when heated, and this phenomenon was known as the pyroelectric effect, and that is why it was called "tourmaline". Korean sweat steaming originated in South Korea, and it experienced several times to evolve from the old Wong Nai Khan into today's high-tech, high-performance, multi-purpose new generation of tourmaline Khan steam. Tourmaline Khan steam is a kind of high-fever physical therapy which uses tourmaline and infrared reflection principle to heat people sweat. By absorbing far-infrared rays, anion, metastable ion and mineral elements released by tourmaline after heating, people's skin metabolizes hazardous substance to improve skin elasticity and promote blood circulation and metabolism, so as to achieve the role of beauty, body and treatment of some chronic diseases. In short, tourmaline has a very obvious effect on improving human health, beauty and diet.

Inorganic microporous compound component containing a certain number of holes in the solid is called porous material, and it is a kind of materials which have network structure of interconnected or closed holes, and the boundary or surface of the holes is constituted of pillar or tablet. Two-dimensional network structure is one of the typical network structure, which is formed by a large number of polygonal holes gathered in the plane, and materials with these structures is known as "honeycomb" material as its shape is similar to the honeycomb's hexagonal structure. Three-dimensional network structure is a more common network structure, which is formed by a large number of polyhedron-shape holes gathered in space, and materials with these structures are often called foam material.

At present, only natural water, mineral water and pure water can be use as drinking water. Tap water is a kind of natural water, which is safe, consistent with body functions and contains beneficial mineral substance. However, the tap water has some problems, such as pipe network's aging, residual chlorine and other secondary pollutions. Anyway, if it can be purified deeply, the tap water can make a more popular and healthy water. The mineral water contains more minerals, but more is not better, and it is not suitable for long-term consumption. In recent years, the mineral water's poor taste and few species cause the recession of its market share. Some mineral water even contains a high level of harmful components, such as light metal and heavy metal, and some even has a high redox potential. The pure water is very different from the traditional drinking water, and it contains a very small amount of trace elements. It has many advantages, such as no bacteria, no virus and clean. However, as the body fluids is slightly alkaline, if people drink slightly acid pure water for a long term, the in vivo environment of the body will be damaged, so people need to choose weak base pure water.

Chinese Pat. No. 95108667.7 discloses a preparation method of high oxygen content drinking water. The water passes through the following device in turn: the raw water inlet device, which includes a dress water container; filtration device, which is located after the raw water inlet device and can use its internal filled filter to remove the sludge, limestone, iron and harmful heavy metals from the water; water softener device, which is located after the aforementioned filtration devices and can use its internal filled material to soften water; deodorizing device, which is located after the aforementioned water softener device and can use its internal filled material to remove the smell; filtration membrane device, which is located after the aforementioned deodorizing device and can take advantage of the fine pore of the filter membrane to remove organics from drinking water; catchment reactor, which is located after the aforementioned Filtration membrane device and can gather up the pre-processing drinking water; ozone sterilization device, which can inject ozone quantitatively into the drinking water within the foregoing catchment reactor, so that the ozone dissolved in the water can sterilize fully and continuously in the subsequent treatment period; precision filtering device, which is located after the aforementioned catchment reactor and can take advantage of the fine pore of filter material to filter the drinking water before the water supply; liquid oxygen supply device, which is located after the aforementioned precision filtering device to improve the oxygen content of the drinking water; and water supply device, which is located after the foregoing liquid oxygen supply device and can supply water in a variety of different ways according to the need.

Chinese Pat. No. 98100621.3 discloses a preparation method of mineral water, which uses pure water as the raw material and adds at least three kinds of mineral salts listed in the following to the pure water to make the mineral water. The species of the mineral salts and its corresponding proportion are shown below: calcium citrate 30.0-869.0 mg/L, calcium gluconate 88.9-2222.0 mg/L, calcium hydrogen phosphate 34-869.0 mg/L, calcium chloride 29-732.0 mg/L, magnesium sulfate 40-808.0 mg/L, potassium chloride 1.9-152.0 mg/L, zinc gluconate 0.36-36.0 mg/L, zinc sulfate 0.22-22.0 mg/L, ferrous sulfate 0.5-2.0 mg/L, ferrous gluconate 0.8-3.3 mg/L, ferric citrate 0.6-2.5 mg/L. The manufacturing process of the mineral water includes the following steps: first, dissolving the previously mentioned mineral salts in a small amount of pure water, respectively, and then adding them to the mixing tank one by one when the water temperature is 25-40 degrees celsius, stirring uniformly until the conductivity of aqueous solutions is 450-520 μs/cm, then stopping and adding ozone to get an ozone concentration in the aqueous solution of 0.2-0.4 mg/L, and then making the aqueous solution pass through the water filter with a pore size of 3-10 micron to remove the possible impurities brought in the production process; at last, making the aqueous solution filtered out pass through the water supply pipe equipped with a UV lamp, and then getting into the canned processes.

Chinese Pat. No. 99105060.6 discloses a preparation method of pure mineralized water. The manufacturing process of the mineral water includes the following steps: a. purifying ordinary clean water after precipitation, filtration and cooling by conventional methods to obtain pure water; b. transporting the above pure water into the mineralization device, at the same time, transporting the purified gas mixture of carbon dioxide and air into the mineralization device, among which, the volume ratio of carbon dioxide and air is 1:3 to 2:1, respectively, and the internal temperature of the mineralization device is controlled between 45-99 degrees celsius, while the pressure is controlled between 2-20kg/cm², and the mineralization time can be controlled according to the water speed of the mineralization device; c. making the mineralized water which meets the salinity requirements precipitate for 6-12 hours, and then filtering it; d. making the mineralized water after filter pass through the activated carbon filter device; e. taking some mineralized water to do sampling tests, so as to detect the content of the master element, and then comparing to the requirement, and adding coordination compounds to make up the difference between the element content; f. filtering the mineralized water after coordination by silicon dry and then by sand filter unit; g. heating the above-mentioned filtering mineralized water to a temperature of above 85 degrees celsius, and insulating for half an hour for sterilization; and h. filling the water under the ultraviolet radiation.

BRIEF SUMMARY OF THE INVENTION

The object of the invention is to provide a preparation method of weakly basic, ionized, mineralized and healthy drinking water, which is rich in anion, minerals and oxygen.

In one embodiment, the invention may be characterized as a preparation method of weakly basic, ionized, mineralized and healthy drinking water, comprising the steps of: purifying the tap water by precipitation, filtration and other conventional methods to obtain clean water; making the said clean water through reverse osmosis (RO) membrane to obtain RO pure water; heating the said RO pure water to 35-100 degrees celsius by magnetic oscillation or by heating, then making the RO pure water through weak alkaline, ionized, and mineralization composition, and then filtering the RO pure water using coconut carbon cartridge and PP cotton filter element in turn.

In another embodiment, the said weak alkaline, ionized, and mineralization composition is a mixture of polymer microspheres or mineral powder and inorganic microporous compounds.

In yet another embodiment, the weight ratio of the said polymer microspheres and inorganic microporous compound is 90-20 wt % and 10-80 wt %, respectively.

In a further embodiment, the weight ratio of the said polymer microspheres and inorganic microporous compound is 80-30 wt % and 20-70 wt %, respectively.

In another further embodiment, the preparation of the said polymer microspheres comprising:
(i) weighting clay, tourmaline, rare earth powder, inorganic porous compounds, ethylene-vinyl alcohol copolymer or vinyl alcohol homopolymer at a weight ratio of 10-90 wt %, 0-50 wt %, 0-50 wt %, 0-20 wt % and 0-20 wt %, respectively, and then mixing them to get the mixture;
(ii) sintering the said mixture at 500-1400 degrees celsius for 1-10 hours;
(iii) dealing the mixture after sintering with the electromagnetic wave with a wavelength of 1 mm-0.001 mm, and then washing and filtering the mixture until the pH of the filtrate is close to neutral, then drying the mixture and sintering it into polymer microspheres;

and the preparation of the said mineral powder comprising:
(i) weighting tourmaline, inorganic microporous compounds and Maifan stone at the weight ratio of 10-90 wt %, 0-40 wt % and 0-50 wt %, respectively, and then mixing them to get the mixture;
(ii) dealing the mixture with the electromagnetic wave with a wavelength in the range of 1 mm to 0.001 mm, and then washing and filtering the mixture until the pH of the filtrate is close to neutral, then drying.

In another further embodiment, the said tourmaline comprises at least one of the substances selected from the group consisting of dravite, schorl, elbaite and tsilaisit. That is to say, the structure of the tourmaline comprises not only silicon-oxygen backbone, but also $BO_3$ anion group. Among them, $Na^+$ can be partly replaced by $K^+$ and $Ca^{2+}$, while $OH^-$ can be replaced by $F^-$. However, $Al^{3+}$ can't be replaced by $Si^{4+}$. Dravite and schorl can form two complete isomorphism, and schorl and elbaite can also form two complete isomorphism, while dravite and elbaite can only form incomplete isomorphism.

In another further embodiment, the particle sizes of the said rare earth powder particle, tourmaline and Maifan stone are in the range of 20-0.001 mm, 20-0.1 mm and 10-0.1 mm, respectively, and the fineness of the rare earth powder is in the range of 10-0.01 mm.

In another further embodiment, the said inorganic microporous compound is porous materials containing a certain number of holes.

In another further embodiment, the aperture of the said inorganic microporous compound is less than or equal to 50 μm.

The invention further provides a preparation method of weakly basic, ionized, mineralized composition, comprising the steps of:
(i) weighting clay, tourmaline, rare earth powder, inorganic porous compounds, ethylene-vinyl alcohol copolymer or vinyl alcohol homopolymer at a weight ratio of 10-90 wt %, 0-50 wt %, 0-50 wt %, 0-20 wt % and 0-20 wt %, respectively, and then mixing them to get the mixture;
(ii) sintering the said mixture at 500-1400 degrees celsius for 1-10 hours;
(iii) dealing the mixture after sintering with the electromagnetic wave with a wavelength of 1 m-0.001 mm, and then washing and filtering the mixture until the pH of the filtrate is close to neutral, then drying the mixture and sintering it into polymer microspheres;
(iv) mixing the said polymer microspheres with inorganic microporous compound.

Advantageous Effect of Invention

First, pH of the water prepared by the present invention is weakly basic with a pH value of 7.6±0.4, which is coordinated with the body fluids which is slightly alkaline with a pH value of 7.38-7.44, so a long-term consumption of this kind of water is beneficial to human body.

Second, the water prepared by the present invention is rich in anion, which is also known as "air vitamin" and has the role of adjusting ion balance of the body. The anion can make people relax, activate cells and improve the natural healing power, and it also can inhibit oxidation or aging of the body. There are many factors that may cause the generation of positive ions in today's environment, which makes people often in a state of tension. And therefore, the anion is an indispensable material for modern humans. In addition, the anion also has a deodorant effect.

Third, the water prepared by the present invention has a high content of oxygen which is in an amount of 8 mg/L or more according to the actual testing. The high content oxygen can accelerate the blood and lymph circulation, and more oxygen transported to the cells can promote cell activation more rapidly. So the water can be easily absorbed by the body and promote the body's metabolism.

Besides, the water molecular beam combined by water molecules of the water prepared by the present invention is quite small, which can remove chlorine or impurities from the water to obtain water with good taste and high body-penetration.

Furthermore, the water prepared by the present invention has a negative potential and the pH of the negative potential water is alkaline, which can balance the lactic acid in the body brought by fatigue. The negative potential water has a high calcium ion content, which is beneficial to the health of the human body; and the negative potential water has a high water solubility and strong penetration, so it has the ability to emulsify fats, which will be helpful to alleviate the symptoms of high blood cholesterol, high cholesterol, high blood viscosity due to high protein, high-calorie induced by diet. Moreover, negative potential water can make the cells always keep vitality and maintain healthy, while anion can help to remove harmful chromate, nitrite and heavy metals and inert metal from the body. The above factors make the negative potential water become a health-care drinking water. In addition, it is proved that the negative potential water can also inhibit the propagation of microorganisms, including bacteria, algae, etc., so the water can also be used in farms, large aquarium and swimming pool.

Moreover, the conductivity of the water prepared by the present invention is less than or equal to 30 μs/cm.

In addition, the water prepared by the present invention has a variety of healthy, ionized and effective mineral ions, such as $Mg^{2+}$, $Ca^{2+}$, $Al^{3+}$, $Fe^{2+}$, $Cu^{2+}$, $Zn^{2+}$, $Pb^{2+}$, $As^{3+}$, $K^+$, $Na^+$, $F^-$, $Cl^-$, which are easier to be absorbed and beneficial to the health of human body. Among them, the contents of the mineral ions are shown below: $Mg^{2+} \leq 0.69$ mg/L, $Ca^{2+} \leq 0.69$ mg/L, $Al^{3+} \leq 0.12$ mg/L, $Fe^{2+} \leq 0.2$ mg/L, $Cu^{2+} \leq 0.01$ mg/L, $Zn^{2+} \leq 0.04$ mg/L, $Pb^{2+} \leq 0.01$ mg/L, $As^{3+} \leq 0.01$ mg/L, $K^+ \leq 0.81$ mg/L, $Na^+ \leq 2.93$ mg/L, $F^- \leq 0.53$ mg/L and $Cl^- \leq 3.19$ mg/L °

In addition, the total number of bacteria of the water prepared by the present invention (MPN/100 mL or CFU/100 mL) was 18 or less, while the total coliform (MPN/100 mL, or CFU/100 mL) were not detected.

A better understanding of the features and advantages of the present invention will be obtained by reference to the following detailed description of the invention.

DETAILED DESCRIPTION OF THE INVENTION

The following description of the presently contemplated best mode of practicing the invention is not be taken in a limiting sense, but is made merely for the purpose of describing the general principles of the invention. The scope of the invention should be determined with reference to the claims.

EXAMPLE 1

(1) Preparation of Polymer Microspheres

50% by weight of clay, 20% by weight of dravite having a particle diameter of 1 mm, 20% by weight of rare earth powder having a particle diameter of 0.1 mm and a fineness of 0.1 mm, 5% by weight of inorganic porous compounds and 5% by weight of ethylene-vinyl alcohol copolymer were mixed together and stirred to obtain the mixture. The mixture was sintered at 1000 degrees celsius for 2 hours. And then the mixture was deal with the electromagnetic wave with a wavelength of 0.01 mm. Subsequently, the mixture was washed and filtered until the pH of the filtrate is close to neutral, and then dried.

(2) Preparation of Weakly Basic, Ionized, Mineralized Composition

80% by weight of the polymer microspheres thus obtained and 20% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 50 degrees celsius by magnetic oscillation, and then the RO pure water was made through weak alkaline, ionized, and mineralization composition thus obtained, and then the RO pure water was filtered by coconut carbon cartridge and PP cotton filter element in turn.

EXAMPLE 2

(1) Preparation of Mineral Powder

80% by weight of dravite having a particle diameter of 1 mm, 10% by weight of inorganic microporous compounds and 10% by weight of Maifan stone having a particle diameter of 1 mm were mixed together and stirred to obtain the mixture. The mixture was deal with the electromagnetic wave with a wavelength of 0.01 mm. Subsequently, the mixture was washed and filtered until the pH of the filtrate is close to neutral, and then dried.

(2) Preparation of Weakly Basic, Ionized, Mineralized Composition

70% by weight of the mineral powder thus obtained and 30% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 80 degrees celsius by heating, and then the RO pure water was made through weak alkaline, ionized, and mineralization composition thus obtained, and then the RO pure water was filtered by coconut carbon cartridge and PP cotton filter element in turn.

EXAMPLE 3

(1) Preparation of Polymer Microspheres

70% by weight of clay, 10% by weight of schorl having a particle diameter of 5 mm, 5% by weight of rare earth powder having a particle diameter of 5 mm and a fineness of 5 mm, 5% by weight of inorganic porous compounds and 10% by weight of vinyl alcohol homopolymer were mixed together and stirred to obtain the mixture. The mixture was sintered at 700 degrees celsius for 5 hours. And then the mixture was deal with the electromagnetic wave with a wavelength of 0.5 mm. Subsequently, the mixture was washed and filtered until the pH of the filtrate is close to neutral, and then dried.

(2) Preparation of Weakly Basic, Ionized, Mineralized Composition

60% by weight of polymer microspheres thus obtained and 40% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 60 degrees celsius by heating, and then the RO pure water was made through weak alkaline, ionized, and mineralization composition thus obtained, and then the RO pure water was filtered by coconut carbon cartridge and PP cotton filter element in turn.

EXAMPLE 4

(1) Preparation of Mineral Powder

50% by weight of elbaite having a particle diameter of 10 mm, 30% by weight of inorganic microporous compounds and 20% by weight of Maifan stone having a particle diameter of 10 mm were mixed together and stirred to obtain the mixture. The mixture was deal with the electromagnetic wave with a wavelength of 0.05 mm. Subsequently, the mixture was washed and filtered until the pH of the filtrate is close to neutral, and then dried.

(2) Preparation of Weakly Basic, Ionized, Mineralized Composition

40% by weight of the mineral powder thus obtained and 60% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 60 degrees celsius by heating, and then the RO pure water was made through weak alkaline, ionized, and mineralization composition thus obtained, and then the RO pure water was filtered by coconut carbon cartridge and PP cotton filter element in turn.

EXAMPLE 5

(1) Preparation of Polymer Microspheres

30% by weight of clay, 20% by weight of schorl having a particle diameter of 15 mm, 20% by weight of rare earth powder having a particle diameter of 15 mm and a fineness of 8 mm, 15% by weight of inorganic porous compounds and 15% by weight of vinyl alcohol homopolymer were mixed together and stirred to obtain the mixture. The mixture was sintered at 1200 degrees celsius for 3 hours. And then the mixture was deal with the electromagnetic wave with a wavelength of 0.02 mm. Subsequently, the mixture was washed and filtered until the pH of the filtrate is close to neutral, and then dried.

(2) Preparation of Weakly Basic, Ionized, Mineralized Composition

30% by weight of polymer microspheres thus obtained and 70% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 50 degrees celsius by heating, and then the RO pure water was made through weak alkaline, ionized, and mineralization composition thus obtained, and then the RO pure water was filtered by coconut carbon cartridge and PP cotton filter element in turn.

EXAMPLE 6

(1) Preparation of Mineral Powder

20% by weight of tsilaisit having a particle diameter of 20 mm, 40% by weight of inorganic microporous compounds and 40% by weight of Maifan stone having a particle diameter of 7 mm were mixed together and stirred to obtain the mixture. The mixture was deal with the electromagnetic wave with a wavelength of 0.005 mm. Subsequently, the mixture was washed and filtered until the pH of the filtrate is close to neutral, and then dried.

(2) Preparation of Weakly Basic, Ionized, Mineralized Composition

20% by weight of mineral powder thus obtained and 80% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 90 degrees celsius by heating, and then the RO pure water was made through weak alkaline, ionized, and mineralization composition thus obtained, and then the RO pure water was filtered by coconut carbon cartridge and PP cotton filter element in turn.

EXAMPLE 7

(1) Preparation of Polymer Microspheres

80% by weight of clay, 5% by weight of schorl having a particle diameter of 0.01 mm, 5% by weight of tsilaisit having a particle diameter of 0.1 mm, 2% by weight of rare earth powder having a particle diameter of 0.1 mm and a fineness of 0.1 mm, 2% by weight of inorganic porous compounds and 6% by weight of vinyl alcohol homopolymer were mixed together and stirred to obtain the mixture. The mixture was sintered at 600 degrees celsius for 10 hours. And then the mixture was deal with the electromagnetic wave with a wavelength of 0.05 mm. Subsequently, the mixture was washed and filtered until the pH of the filtrate is close to neutral, and then dried.

(2) Preparation of Weakly Basic, Ionized, Mineralized Composition

90% by weight of polymer microspheres thus obtained and 10% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 100 degrees celsius by heating, and then the RO pure water was made through weak alkaline, ionized, and mineralization composition thus obtained, and then the RO pure water was filtered by coconut carbon cartridge and PP cotton filter element in turn.

EXAMPLE 8

(1) Preparation of Mineral Powder

70% by weight of tsilaisit having a particle diameter of 12 mm, 15% by weight of inorganic microporous compounds and 15% by weight of Maifan stone having a particle diameter of 3 mm were mixed together and stirred to obtain the mixture. The mixture was deal with the electromagnetic wave with a wavelength of 0.08 mm. Subsequently, the mixture was washed and filtered until the pH of the filtrate is close to neutral, and then dried.

(2) Preparation of Weakly Basic, Ionized, Mineralized Composition

75% by weight of mineral powder thus obtained and 25% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 85 degrees celsius by heating, and then the RO pure water was made through weak alkaline, ionized, and mineralization composition thus obtained, and then the RO pure water was filtered by coconut carbon cartridge and PP cotton filter element in turn.

EXAMPLE 9

(1) Preparation of Mineral Powder

40% by weight of schorl having a particle diameter of 3 mm, 30% by weight of inorganic microporous compounds and 30% by weight of Maifan stone having a particle diameter of 0.3 mm were mixed together and stirred to obtain the mixture. The mixture was deal with the electromagnetic wave with a wavelength of 0.8 mm. Subsequently, the mixture was washed and filtered until the pH of the filtrate is close to neutral, and then dried.

(2) Preparation of Weakly Basic, Ionized, Mineralized Composition

65% by weight of mineral powder thus obtained and 35% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 75 degrees celsius by heating, and then the RO pure water was made through weak alkaline, ionized, and mineralization composition thus obtained, and then the RO pure water was filtered by coconut carbon cartridge and PP cotton filter element in turn.

EXAMPLE 10

(1) Preparation of Mineral Powder

20% by weight of dravite having a particle diameter of 0.005 mm, 20% by weight of schorl having a particle diameter of 0.6 mm, 20% by weight of inorganic microporous compounds and 40% by weight of Maifan stone having a particle diameter of 1.5 mm were mixed together and stirred to obtain the mixture. The mixture was deal with the electromagnetic wave with a wavelength of 0.03 mm. Subsequently, the mixture was washed and filtered until the pH of the filtrate is close to neutral, and then dried.

(2) Preparation of Weakly Basic, Ionized, Mineralized Composition

55% by weight of mineral powder thus obtained and 45% by weight of inorganic microporous compound which were porous materials containing a certain number of holes and had an aperture of less than 50 μm were mixed to obtain weakly basic, ionized, mineralized composition.

(3) Preparation of Weakly Basic, Ionized, Mineralized and Healthy Drinking Water The tap water was purified by precipitation, filtration and other conventional methods and clean water was obtained, and then the clean water was made through reverse osmosis (RO) membrane and RO pure water was obtained. Subsequently, the RO pure water was heated to 55 degrees celsius by heating, and then the RO pure water was made through weak alkaline, ionized, and mineralization composition thus obtained, and then the RO pure water was filtered by coconut carbon cartridge and PP cotton filter element in turn.

The weak alkaline, ionized and mineralization drinking water obtained in Example 8 is evaluated by regular detection. For comparison, ordinary drinking water, mineral water, ordinary pure water, RO pure water and Shuiyisheng water are also evaluated. The regular indicators of the above water is based on GB 5749-2006 standard, and the results are shown in Table 1, Table 2 and Table 3.

TABLE 1

Sensory characteristics and genreal chemical indicators

| Items | Ordinary drinking water | | Mineral water | | Ordinary pure water (GJ 94-1999) | RO pure water | Shuiyisheng water | Drinking water prepared by the present invention |
|---|---|---|---|---|---|---|---|---|
| | Wuhan (GB 5749-2006) | Dongguan | Shanquan (GB 8537-2008) | Lebaishi | | | | |
| Chromaticity | ≤15 (≤15) | ≤15 | ≤15 (≤15) | ≤15 | ≤5 | — | — | ≤5 |
| Turbidity | 0.5 (≤1) | ≤1 | ≤1 (≤1) | ≤1 | ≤1 | — | — | ≤0.5 |
| Water molecular beam | — | — | — | — | — | oil emulsion | oil emulsion | oil emulsion |

TABLE 1-continued

Sensory characteristics and genreal chemical indicators

| Items | Ordinary drinking water Wuhan (GB 5749-2006) | Ordinary drinking water Dongguan | Mineral water Nongfu Shanquan (GB 8537-2008) | Mineral water Lebaishi | Ordinary pure water (GJ 94-1999) | RO pure water | Shuiyisheng water | Drinking water prepared by the present invention |
|---|---|---|---|---|---|---|---|---|
| Smell | no | no | no | no | no | no | no | no |
| Visible matter | no, Not be detected | no | no | no | no | no | no | no |
| pH | 7.2 (6.5-8.5) | 6.9 | 7.3 ± 0.5 | 6.85 | 5.0-7.0 | 6.27 | 9.59 | 7.6 ± 0.4 |
| Conductivity (μs/cm) | 240 | — | 94.3 | 37.1 | ≤10 | 7.83 | 56.77 | ≤30 |
| Oxygen content (mg/L) | 6.51 | — | 7.11 | 6.93 | — | 5.84 | 10.11 | 8.0 ± 0.5 |

TABLE 2

Toxicology and genreal chemical indicators

| Items | Ordinary drinking water Wuhan (GB 5749-2006) | Ordinary drinking water Dongguan | Mineral water Nongfu Shanquan (GB 8537-2008) | Mineral water Lebaishi | Ordinary pure water (GJ 94-1999) | RO pure water | Shuiyisheng water | Drinking water prepared by the present invention |
|---|---|---|---|---|---|---|---|---|
| Total hardness (mg/L) ($Mg^{2+}$, $Ca^{2+}$) | 61 | ≤450 ≤450 | ≥4.50 ≥4.50 | ≥4.50 | ≥10 | 2.0 | 2.5 | ≤0.69 |
| $Al^{3+}$ (mg/L) | 0.36 | ≤0.2 ≤0.2 | — | — | — | | | ≤0.12 |
| $Fe^{2+}$ (mg/L) | 0.05 | ≤0.3 ≤0.3 | — | — | — | | | ≤0.2 |
| $Cu^{2+}$ (mg/L) | 0.03 | ≤1.0 ≤1.0 | ≤1.0 | ≤1.0 | ≤1.3 | | | ≤0.01 |
| $Zn^{2+}$ (mg/L) | 0.11 | ≤1.0 ≤1.0 | ≥0.20 ≥0.20 | ≥0.20 | ≤0.5 (American, ASTM-1983) | | | ≤0.04 |
| $Pb^{2+}$ (mg/L) | <0.01 | ≤0.01 ≤0.01 | — | ≤0.01 | — | | | ≤0.01 |
| $As^{3+}$ (mg/L) | <0.01 | ≤0.01 ≤0.01 | ≤0.01 ≤0.01 | ≤0.01 | — | | | ≤0.01 |
| $K^{+}$ (mg/L) | — | — | ≥0.35 | — | ≤1.0 (American, ASTM-1983) | 1.0 | 1.8 | ≤0.81 |
| $Na^{+}$ (mg/L) | — | — | ≥0.80 | — | ≤1.0 (American, ASTM-1983) | 2.7 | 1.1 | ≤2.93 |
| $F^{-}$ (mg/L) | 0.3 | ≤1.0 ≤1.0 | ≤1.50 ≤1.50 | ≤1.50 | — | 0.1 | 0.9 | ≤0.53 |
| $Cl^{-}$ (mg/L) | 3.53 | ≤250 ≤250 | — | — | ≤250 | 3.6 | 4.8 | ≤3.19 |

TABLE 3

Microbiological indicators

| Microbiological indicators | Ordinary drinking water Wuhan (GB 5749-2006) | Ordinary drinking water Dongguan | Mineral water Nongfu Shanquan (GB 8537-2008) | Mineral water Lebaishi | Ordinary pure water (GJ 94-1999) | RO pure water | Shuiyisheng water | Drinking water prepared by the present invention |
|---|---|---|---|---|---|---|---|---|
| Total number of bacteria (MPN/100 mL or CFU/100 mL) | ≤100 (≤100) | ≤100 | ≤100 (≤100) | 7 | ≤20 | 384 | 708 | 18 |

TABLE 3-continued

| | Microbiological indicators | | | | | | | |
|---|---|---|---|---|---|---|---|---|
| | Ordinary drinking water | | Mineral water | | | | | Drinking water prepared by the present invention |
| | | | Nongfu Shanquan (GB 8537-2008) | Lebaishi | Ordinary pure water (GJ 94-1999) | RO pure water | Shuiyisheng water | |
| Microbiological indicators | Wuhan (GB 5749-2006) | Dongguan | | | | | | |
| Total coliforms (MPN/100 mL or CFU/100 mL) | Not detected Not be detected | Not detected | Not detected Not be detected | Not detected | ≤3 | Not detected | Not detected | Not detected |
| Thermotolerant coliforms (MPN/100 mL or CFU/100 mL) | Not detected Not be detected | Not detected | Not detected Not be detected | Not detected | Not be detected | — | — | Not detected |
| Escherichia coli (MPN/100 mL or CFU/100 mL) | Not detected Not be detected | Not detected | Not detected Not be detected | Not detected | Not be detected | — | — | Not detected |
| Staphylococcus aureus | Not — | detected | Not — | detected | Not | detected | Not | Not detected |
| Yeasts and molds | Not — | detected | Not — | detected | Not | detected | 1 | Not detected |

It was ascertained from Table 1 to 3 that the water prepared by the present invention has an appropriate pH value, a negative potential, a higher content of anion and oxygen, a smaller water molecular beam, a lower conductivity, a variety of ionized effective mineral ions and less total number of bacteria, which is beneficial to the health of human body and suitable for long-term consumption.

While the invention herein disclosed has been described by the specific embodiments and applications thereof, numerous modifications and variations could be made thereto by those skilled in the art without departing from the scope of the invention set forth in the claims.

What is claimed is:

1. A preparation method of weakly basic, ionized and mineralized drinking water, comprising the steps of: purifying tap water by precipitation and filtration to obtain clean water; passing the clean water through reverse osmosis (RO) membrane to obtain RO pure water, heating the RO pure water to 35-100°C. by magnetic oscillation or by heating; and then passing the RO pure water through a weakly alkaline, ionized, mineral composition, and then filtering the RO pure water using coconut carbon cartridge and Polypropylene (PP) cotton filter element in turn;

the weakly alkaline, ionized, mineral composition is a mixture of polymer microspheres or mineral powder and inorganic microporous compound;

a weight ratio of the polymer microspheres to the inorganic microporous compound ranges from 90:10 to 20:80;

a preparation method of the polymer microspheres comprises the following steps:
   1. weighing 10-90 wt % of clay, 0-50 wt % of tourmaline, 0-50 wt % of rare earth powder, 0-20 wt % of inorganic porous compounds, and 0-20 wt % of ethylene-vinyl alcohol copolymer or vinyl alcohol homopolymer, and then mixing them to get a mixture;
   2. sintering the mixture obtained in step 1 at 500 to 1400° for 1 hour to 10 hours;
   3. treating the mixture after sintering with electromagnetic wave having a wavelength of 1 mm-0.001 mm, and then washing and filtering the mixture until a filtrate having a pH value close to neutral is obtained, and then drying and sintering the filtrate into the polymer microspheres;

a preparation method of the mineral powder comprises the following steps:

a. weighing 10-90 wt % of tourmaline, 0-40 wt % of inorganic microporous compounds and 0-50 wt % of Maifan stone, and then mixing them to get a mixture;
   b. treating the mixture obtained in step a with electromagnetic wave having a wavelength of 1 mm to 0.001 mm, and then washing and filtering the mixture until a filtrate having a pH value close to neutral is obtained, and then drying the filtrate to obtain the mineral powder.

2. The method of claim 1, wherein the weight ratio of the polymer microspheres to the inorganic microporous compound ranges from 80:20 to 30:70.

3. The method of claim 1, wherein the tourmaline comprises at least one substance selected from a group consisting of dravite, schorl, elbaite and tsilalsit.

4. The method of claim 1, wherein the rare earth powder has a particle size of 20 mm-0.001 mm, the tourmaline has a particle size of 20 mm-0.1 mm, and the Maifan stone has a particle size of 10 mm-0.1 mm, and fineness of the rare earth powder is in a range of 10 to 0.01 mm.

5. The method of claim 1, wherein the inorganic microporous compound is porous materials containing a certain number of holes.

6. The method of claim 5, wherein each of the holes of the inorganic microporous compound is less than or equal to 50 μm.

7. A preparation method of weakly alkaline, ionized, mineral composition, comprising the steps of:
   (i) weighing 10-90 wt % of clay, 0-50 wt % of tourmaline, 0-50 wt % of rare earth powder, 0-20 wt % of inorganic porous compounds, and 0-20 wt % of ethylene-vinyl alcohol copolymer or vinyl alcohol homopolymer, and then mixing them to get a mixture;
   (ii) sintering the mixture at 500 to 1400° C. for 1 hour to 10 hours;
   (iii) treating the mixture after sintering with electromagnetic wave having a wavelength of 1 m-0.001 mm, and then washing and filtering the mixture until a filtrate having a pH value close to neutral is obtained, and then drying and sintering the filtrate into polymer microspheres;
   (iv) mixing the polymer microspheres with inorganic microporous compound.

* * * * *